United States Patent [19]

Schnell et al.

[11] 4,447,941

[45] May 15, 1984

[54] DEWATERING ROLL OF A WIRE PRESS

[75] Inventors: Hans Schnell, Mengen; Rolf Wenske, Ravensburg-Torkenweiler, both of Fed. Rep. of Germany

[73] Assignee: Escher Wyss GmbH, Ravensburg, Fed. Rep. of Germany

[21] Appl. No.: 373,848

[22] Filed: May 3, 1982

[30] Foreign Application Priority Data

May 11, 1981 [CH] Switzerland ........................ 3026/81

[51] Int. Cl.³ ............................................ A01B 29/00

[52] U.S. Cl. .................................. 29/121.1; 100/121; 162/372

[58] Field of Search .................... 29/121.1, 121.4, 127, 29/128, 130, 125; 162/368, 372, 369, 370, 371, 357; 100/121, 90, 155 R, 176

[56] References Cited

U.S. PATENT DOCUMENTS

| | | | |
|---|---|---|---|
| 1,908,519 | 5/1933 | Leonard | 100/121 X |
| 2,217,552 | 10/1940 | Horton | 29/130 X |
| 3,111,742 | 11/1963 | Lakin | 29/125 |
| 3,231,934 | 2/1966 | Diotti | 29/125 X |
| 3,562,883 | 2/1971 | Kobayashi | 29/121.4 X |

*Primary Examiner*—Carl E. Hall
*Assistant Examiner*—John T. Burtch
*Attorney, Agent, or Firm*—Werner W. Kleeman

[57] ABSTRACT

A dewatering roll or cylinder of a wire press possesses radial support walls upon which there is supported a roll shell or jacket. The roll shell possesses gaps or spaces piercingly extending through the roll shell. The support walls are provided with outflow openings for the expressed liquid.

8 Claims, 8 Drawing Figures

Fig. 1
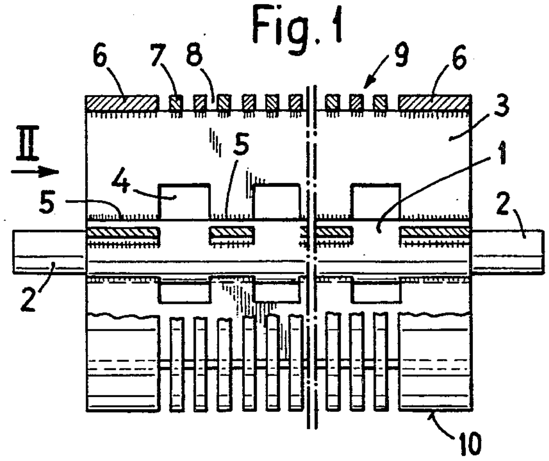
Fig. 2
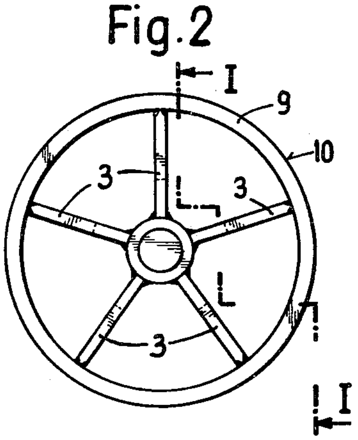
Fig. 3
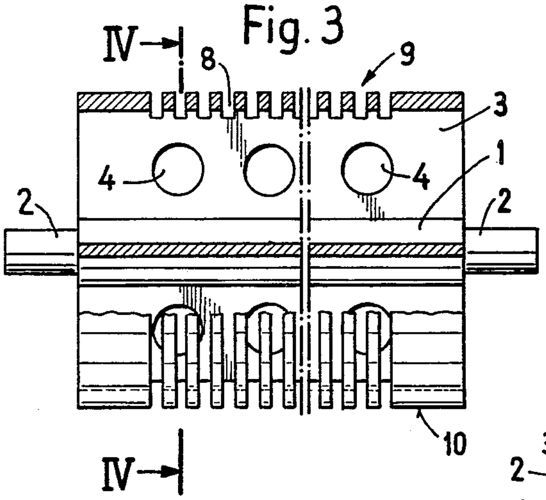
Fig. 4
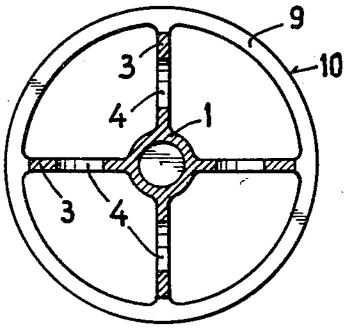
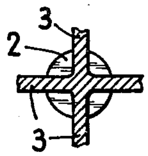
Fig. 7
Fig. 5
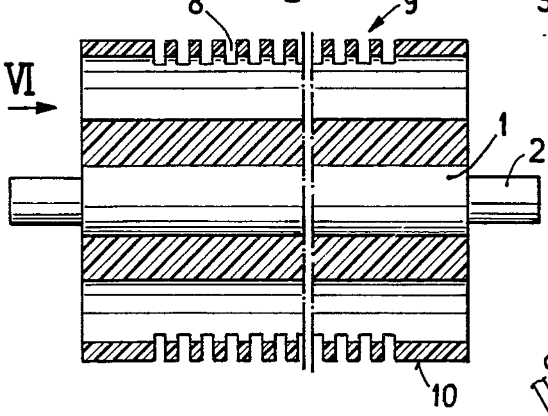
Fig. 6
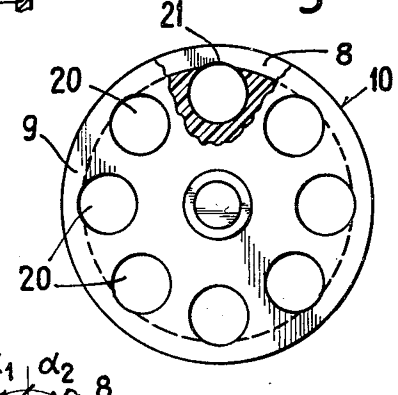
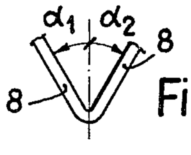
Fig. 8

DEWATERING ROLL OF A WIRE PRESS

BACKGROUND OF THE INVENTION

The present invention relates to a new and improved construction of a dewatering roll or cylinder of a wire or sieve press.

Generally speaking, the dewatering roll of the present development is of the type possessing a substantially cylindrical roll shell or jacket equipped with outflow openings for the expressed liquid, the cylindrical roll shell being supported upon radial arms or arm members.

Such type of dewatering rolls can be benefically utilized, for instance, at wire or sieve presses for the preparation of stock used in papermaking machines. However, such dewatering rolls can also be advantageously employed in other different fields of application. The heretofore known dewatering rolls have a complicated construction and thus possess an inadequate structural rigidity or stiffness.

SUMMARY OF THE INVENTION

Therefore, with the foregoing in mind it is a primary object of the present invention to provide a new and improved construction of dewatering roll of a wire press which is not afflicted with the aforementioned drawbacks and limitations of the prior art.

Another and more specific object of the present invention is directed to a new and improved construction of a dewatering roll of the aforementioned type, which is extremely simple in its construction, can be fabricated in a relatively facile and inexpensive manner, and possesses an extremely great rigidity or structural stiffness.

A further significant object of the present invention is directed to a new and improved construction of dewatering roll or cylinder for a wire press, which dewatering roll is relatively simple in construction and design, economical to manufacture, extremely reliable in operation, not readily subject to breakdown or malfunction, and requires a minimum of maintenance.

Now in order to implement these and still further objects of the invention, which will become more readily apparent as the description proceeds, the inventive dewatering roll or cylinder—hereinafter simply usually referred to as a dewatering roll—is manifested by the features that the radial arm members are constituted by support walls extending essentially axially, along essentially the entire length of the roll shell or jacket. The roll shell possesses at least one gap which, along at least a portion of its extent or expanse, piercingly extends through the wall thickness of the roll shell and forms throughflow or throughpassage openings for the liquid.

The support walls which are used in accordance with the teachings of the invention form carriers possessing a high moment of resistance and impart to the dewatering roll a large rigidity. The cylindrical roll shell equipped with the gap or with a plurality of gaps likewise can be extremely simply fabricated with large throughflow cross-sectional area for the liquid.

Preferably, the roll shell can be provided with a plurality of gaps extending in the circumferential direction. The circumferentially extending gaps impart to the roll shell the shape of coaxial rings or ring members which extend parallel to one another. Consequently, there is obtained a construction of dewatering roll which can be fabricated in a particularly simple fashion, and thus possesses a high rigidity or structural stiffness with large throughflow cross-section for the expressed liquid.

However, an embodiment of roll shell is possible wherein the gap extends essentially along a helical-shaped or screw line, and in particular, there can be provided outflow gaps having opposite direction or sense of the pitch of the helically-shaped gaps. With gaps having opposite pitch it is possible, with appropriately selected direction of rotation of the dewatering roll, to benefically obtain a spreading apart or so-to-speak spreading wide of the wire or sieve which is guided upon the dewatering roll.

According to an extremely simple construction of dewatering roll the roll shell can be composed of ring members or rings which are displaced on to the support walls and affixed, such as, for instance, by welding with such support walls. In this case also the support walls or wall members are fabricated as a welded construction.

However, the dewatering roll can be constituted by a cast element produced as a one piece casting, and which possesses machined grooves extending through the roll shell into the support walls. Such constructional embodiment is particularly suitable for the fabrication of mass produced dewatering rolls, i.e. large numbers of such dewatering rolls.

Also, it is possible to design the dewatering roll, according to a further embodiment of the invention, such that the dewatering roll possesses at its circumferential region openings extending parallel to its roll axis. Grooves formed at the outer cylindrical surface of the roll communicate with these openings. This type of dewatering roll design manifests itself by its particularly advantageous dimensional rigidity or stiffness, rendering possible, for instance, the fabrication of the dewatering roll from suitable plastic materials.

Preferably, with all of the exemplary embodiments of dewatering roll the support walls or wall members can be equipped with openings or ports for the outflow or egress of the liquid. Consequently, the removable of the liquid out of the interior of the dewatering roll is possible along an extremely short path, since such liquid need not flow towards the ends of the dewatering roll.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a front view, partially in section, of a first exemplary embodiment of dewatering roll, the section being taken substantially along the section line I—I of FIG. 2;

FIG. 2 is an end view of the dewatering roll shown in FIG. 1, looking in the direction of the arrow II thereof;

FIG. 3 is a view, analagous to the showing of FIG. 1, of a different embodiment of dewatering roll;

FIG. 4 is a sectional view of the dewatering roll shown in FIG. 3, taken substantially along the line IV—IV thereof;

FIG. 5 is an axial sectional view of a further exemplary embodiment of dewatering roll;

FIG. 6 is an end view, partially in section looking in the direction of the arrow VI of FIG. 5;

FIG. 7 is a detailed showing of a different embodiment of dewatering roll of the type shown in FIGS. 3 and 4, and illustrating a corresponding fragmentary sectional view analogous to the sectional view of FIG. 4; and FIG. 8 is a schematic illustration for explaining the guiding of the gap in the form of helical or screw lines.

DETAILED DESCRIPTION OF THE PREFERRED EMBODIMENTS

Describing now the drawings, it is to be understood that only enough of the construction of the dewatering roll or cylinder has been illustrated in the drawings to enable those skilled in the art to readily understand the underlying principles and concepts of the present development, while simplifying the showing of the drawings. Turning attention now to the exemplary embodiment depicted in FIGS. 1 and 2, the dewatering roll shown therein will be seen to contain a central shaft 1 provided with the shaft journals 2 at opposed ends of such shaft 1. The shaft 1 can possess a tubular construction or can be a solid shaft. Upon shaft or axle 1 there are secured, for instance by welding, radial support walls or wall members 3 in which there are formed outflow or egress openings 4. These outflow openings or ports 4 are located directly after the surface of the shaft 1. Consequently, there is realised a beneficial saving in the length of the welding seams 5, and additionally, the resistance moment of the support walls 3 is only inappreciably reduced by the presence of the outflow openings 4. Finally, by virtue of this design there is realised an extremely short outflow path from the upper region of the dewatering roll downwardly through the shaft region.

Ring members or rings 6 and 7 are displaced on to the support walls 3 and welded thereat. Gaps or spaces 8 are formed between the ring members 6 and 7, as particularly well seen by referring to FIG. 1, and such gaps 8 allow a throughflow of the expressed liquid from the outer surface 10 of the roll towards the inside or interior thereof.

A further embodiment of dewatering roll has been depicted in FIGS. 3 and 4. This design of dewatering roll differs from the dewatering roll discussed above and illustrated in FIGS. 1 and 2 predominantly by virtue of the fact that it can be fabricated as a one-piece casting and does not constitute any welded construction. As a matter of convenience, it will be recognized and understood that the parts of the dewatering roll depicted in FIGS. 3 and 4 which are analogous to those roll parts of the roll construction of FIGS. 1 and 2 have been conveniently designated with the same reference characters.

With the dewatering roll construction of the type shown in FIGS. 3 and 4 it can be advantageous to cast the roll shell 9 so as to be solid, i.e. without any gaps, and to construct the gaps 8 in the form of grooves which are produced upon a suitable machine tool, such as a lathe. Additionally, the shaft 1, as illustrated also for the construction of FIGS. 1 and 2, can be tubular-shaped, and the shaft journals 2 can be mounted in suitable not particularly referenced bores of the shaft 1.

As also will be apparent by referring to FIG. 7, it is conceivable to provide a construction wherein the support walls 3 intersect at the region of the rotational axis of the dewatering roll, and the roll journals 2 are only secured in any suitable fashion at the ends of the dewatering roll between the support walls or wall members 3.

Continuing, the modified construction of dewatering roll depicted in FIGS. 5 and 6 differs in its construction some what more extensively from the design of dewatering rolls heretofore discussed with reference to FIGS. 1, 2, 3, 4 and 7. With this embodiment the dewatering roll is provided with openings 20 located at its circumferential region. These openings or channels 20 extend essentially parallel to the lengthwise axis of the dewatering roll. Engaging with such parallel extending openings 20 are grooves 8 formed at the cylindrical outer surface or region 10 of the dewatering roll. At the intersection locations there are formed the required openings 21 for the outflow of the liquid. The support walls or wall members 3, in this case, are formed by the portions of the material of the dewatering roll located between neighboring openings 20.

As will be further evident by referring to FIGS. 5 and 6, the dewatering roll, in this case, can be fabricated of a suitable plastic material, and it can be provided with a metallic shaft 10 having the shaft journals 2 in order to impart the requisite rigidity or structural stiffness to the dewatering roll. The fabrication of such type of dewatering roll was heretofore not possible, and which for reasons of weight, cost and corrosion resistance is particularly advantageous.

Finally, in FIG. 8 there is disclosed a possibility of constructung the gap 8. While the gaps 8 are of substantially ring-shaped design for the roll constructions of FIGS. 1, 3 and 5, they also can possess the shape of at least one helical or screw line. According to a particularly advantageous design there can be used two helical or screw lines having the same pitch angles $\alpha 1$ and $\alpha 2$, however with opposite pitch sense. With a suitably selected direction of travel or movement of the wire guided over the roll there is thus benefically attained a so-called wide spreading action of the wire or sieve, i.e., a force is effective at the wire which strives to expand or spread such wire apart in its width.

Although in all of the exemplary embodiments of dewatering rolls disclosed herein there have been illustrated the use of radial support walls or wall members 3 which extend axially along the entire length of the roll shell or jacket 9, it should be expressly understood that, in particular with the roll design disclosed with respect to the embodiment of FIGS. 3 and 4, there are conceivable for casting technological reasons deviations from such exact shape. Thus, for instance, the support walls can be slightly domed or can deviate from an exact radial direction. Such type of deviation also is conceivable in the axial direction.

With the embodiment of dewatering roll shown and disclosed above with reference to FIGS. 5 and 6 the openings or channels 20 at the same time delimit an outer region 9 which corresponds to the roll shell or jacket 9 of the preceding exemplary embodiments.

While there are shown and described present preferred embodiments of the invention, it is to be distinctly understood that the invention is not limited thereto, but may be otherwise variously embodied and practiced within the scope of the following claims. ACCORDINGLY,

What we claim is:

1. A dewatering roll for a wire press comprising:

a substantially cylindrical roll shell provided with at least one outflow opening for expressed liquid;

substantially radially extending arm members for supporting said roll shell;

said radially extending arm members being formed by support walls extending essentially axially along essentially the entire length of the roll shell;

said roll shell being provided with at least one gap forming said outflow opening;

said gap piercing the wall thickness of the roll shell along at least a portion of its extent and providing said outflow opening;

said roll shell possesses a plurality of gaps extending in the circumferential direction of the roll shell and defining a plurality of throughflow openings for the expressed liquid; and said plurality of circumferentially extending gaps imparting to the roll shell the shape of coaxial ring members which extend essentially parallel to one another.

2. The dewatering roll as defined in claim 1, wherein:

said ring members being defined by rings forming the roll shell; and said rings being mounted upon the support walls and welded with said support walls.

3. The dewatering roll as defined in claim 1, wherein:

said dewatering roll is fabricated as a one-piece casting containing machined grooves extending through the roll shell into the support walls.

4. The dewatering roll as defined in claim 1, wherein:

the support walls are provided with openings for the outflow of the liquid.

5. A dewatering roll for a wire press comprising:

a substantially cylindrical roll shell provided with at least one outflow opening for expressed liquid;

substantially radially extending arm members for supporting said roll shell;

said radially extending arm members being formed by support walls extending essentially axially along essentially the entire length of the roll shell;

said roll shell being provided with at least one gap forming said outflow opening;

said gap piercing the wall thickness of the roll shell along at least a portion of its extent and providing said outflow opening; and said gap extends essentially in a helically-shaped configuration.

6. The dewatering roll as defined in claim 5, wherein:

said roll shell is provided with a plurality of said helically-shaped gaps having opposite pitch sense.

7. A dewatering roll for a wire press comprising:

a substantially cylindrical roll shell provided with at least one outflow opening for expressed liquid;

substantially radially extending arm members for supporting said roll shell;

said radially extending arm members being formed by support walls extending essentially axially along essentially the entire length of the roll shell;

said roll shell being provided with at least one gap forming said outflow opening;

said gap piercing the wall thickness of the roll shell along at least a portion of its extent and providing said outflow opening;

said dewatering roll is provided with openings at its circumferential region;

said openings extending essentially parallel to the lengthwise axis of the roll;

a plurality of grooves defining a plurality of said outflow openings and formed at a cylindrical outer surface of the dewatering roll defining said roll shell; and said grooves engaging with said parallel openings.

8. The dewatering roll as defined in claim 7, wherein:

said dewatering roll is formed of a plastic material.

* * * * *